United States Patent [19]

Nakai et al.

[11] 4,288,144
[45] Sep. 8, 1981

[54] OPTICAL FIBER SUBMARINE CABLE

[75] Inventors: Taiichiro Nakai, Fujisawa; Kahei Furusawa, Kamifukuoka; Makoto Nunokawa, Kawasaki; Yoshihiro Ejiri, Tokyo, all of Japan

[73] Assignee: Kokusai Denshin Denwa Kabushiki Kaisha, Japan

[21] Appl. No.: 115,331

[22] Filed: Jan. 25, 1980

[30] Foreign Application Priority Data

Jan. 26, 1979 [JP] Japan .................................. 54/7043

[51] Int. Cl.³ ............................................... G02B 5/16
[52] U.S. Cl. ............................ 350/96.23; 174/23 R; 174/23 C
[58] Field of Search ................. 350/96.23; 174/23 R, 174/23 C

[56] References Cited

U.S. PATENT DOCUMENTS

| 3,347,974 | 10/1967 | Arendt et al. | 174/23 R |
| 4,110,137 | 8/1978 | Beach | 174/23 C |
| 4,190,570 | 2/1980 | Kaufman et al. | 174/23 C |

FOREIGN PATENT DOCUMENTS 1445732  8/1976  United Kingdom ............ 350/96.23

*Primary Examiner*—Stewart J. Levy
*Attorney, Agent, or Firm*—Robert E. Burns; Emmanuel J. Lobato; Bruce L. Adams

[57] ABSTRACT

An optical fiber submarine cable, in which a high viscosity material of good wettability containing air gaps is filled in a space between an optical fiber cord having housed therein at least one coated optical fiber and a pressure resisting material layer having housed therein the optical fiber cord for protecting it from seawater pressure. The air gaps and the high viscosity material are arranged alternately with each other in the space at suitable intervals in the lengthwise direction of the cable. Alternatively, the air gaps are contained in the form of bubbles in the high viscosity material.

7 Claims, 7 Drawing Figures

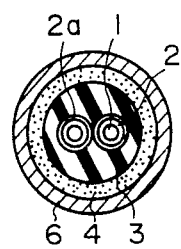 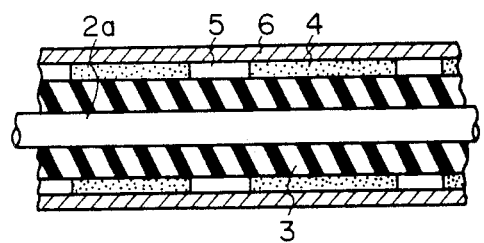
Fig. 1A  Fig. 1B
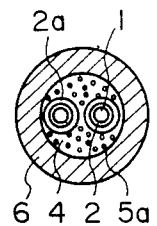 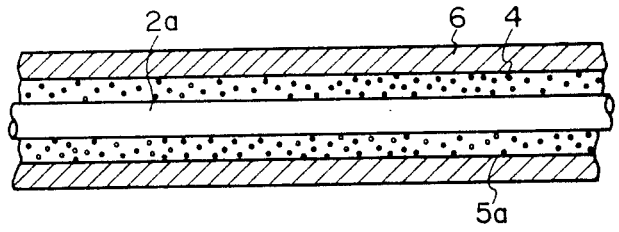
Fig. 2A  Fig. 2B

OPTICAL FIBER SUBMARINE CABLE

BACKGROUND OF THE INVENTION

This invention relates to a structure of an optical fiber submarine cable for use in the field of light communication employing a low-loss optical fiber as a transmission medium.

Since an optical fiber is very brittle it is usually coated with nylon, polyethylene or the like when put to practical use. In a case of the coated optical fiber being employed in a submarine cable, if seawater pressure is applied to the coated optical fiber, it causes an increase in transmission loss, making impossible the effective use of the low-loss property which is characteristic of the optical fiber; furthermore, exposure of the coated optical fiber to the seawater pressure is also undesirable from the view-point of reliability of the optical fiber. To avoid this, there has been proposed an optical fiber submarine cable of such a construction that a coated optical fiber is housed in a small-diametered, cylindrical pressure resisting structure so as to protect the coated optical fiber from seawater pressure. In such a cable, however, when applied with seawater pressure, the inner diameter of the pressure resisting structure is reduced, though slightly, resulting in some pressure being applied to the coated optical fiber through a material present between the coated optical fiber and the pressure resisting structure. Accordingly, a cable structure of the type that oil or plastic material is filled in the space defined between the inner wall of the pressure resisting structure and the coated optical fiber allows application of a pressure of about 1/10 of the seawater pressure to the coated optical fiber and hence is not preferred. In a case where the coated optical fiber is not closely packed but housed in the pressure resisting structure with a suitable air gap defined therebetween, no pressure is applied to the coated optical fiber to such an extent as to affect the transmission loss by the reduction of the inner diameter of the pressure resisting structure due to the seawater pressure applied thereto because the compressibility factor of air is larger than that of a liquid or solid material. In such a cable structure in which the air gap exists between the coated optical fiber and the pressure resisting structure, however, if the cable is damaged by fishing implements, an anchor of a vessel or the like, then seawater enters into the pressure resisting structure from the damaged part, exposing the coated optical fiber to seawater over substantially the entire length of one repeater section. The principal component of the coated optical fiber is usually high purity quartz; in a humid atmosphere such as in the sea, there is a fear that the strength of the material of the optical fiber is lowered so as to result in breakage of the optical fiber. Further, quartz itself is easily affected by sodium ions. Therefore, if seawater enters into the pressure resisting structure as a result of damage inflicted on the cable, as mentioned above, then the mechanical properties of the optical fiber are adversely affected. Moreover, if the cable is repaired with the seawater left remaining in the pressure resisting structure, then the remaining seawater and undulations of the bottom of the sea cause a non-uniform pressure to be applied to the optical fiber to degrade its transmission characteristic, so that a submarine cable transmission system of high reliability and good quality cannot be maintained, and the optical fiber submarine cable must be replaced by a new one over one repeater section; since the cost and labor for repair of injury are enormous, the above said cable structure is very uneconomical. Accordingly, it is important to design a cable in a manner to minimize the possibility of the coated optical fiber being exposed to seawater when the cable is damaged.

SUMMARY OF THE INVENTION

An object of this invention is to provide an optical fiber submarine cable which is capable of preventing the entering of seawater into the coated optical fiber under seawater pressure and when the cable is damaged.

The optical fiber submarine cable of the present invention has such a construction that the coated optical fiber is housed in the pressure resisting structure for protection from seawater pressure, and a high viscosity material of good wettability such, for example, as polyisobutylene, oil or the like is filled in the gap between the pressure resisting structure and the coated optical fiber. The high viscosity material is filled in the abovesaid gap in such a manner as to lie alternately with air gaps at intervals in the axial direction of the cable; alternatively, after bubbles of air or gas are mixed uniformly in polyisobutylene, oil or like high viscosity material to increase its compressibility factor equivalently, the high viscosity material is filled in the aforementioned gap. With such an arrangement, a pressure increase in the coated optical fiber housing, which is caused by deformation of the pressure resisting structure due to application thereto of the seawater pressure, is absorbed by the abovesaid air gaps and gas and hence can be reduced. Even if seawater enters into the pressure resisting structure when the cable is damaged, the presence of polyisobutylene or oil of high viscosity and good wettability can limit the entering of seawater to the damaged part and its vicinity. Accordingly, the injured cable can be restored only by replacing the injured part of the cable by a new one, so that the repair is easy and economical.

BRIEF DESCRIPTION OF THE INVENTION

The present invention will be described in detail below with reference to the accompanying drawings, in which:

FIGS. 1A and 1B are, respectively, a cross-sectional view and a longitudinal sectional view showing an embodiment of this invention;

FIGS. 2A and 2B are, respectively, a cross-sectional view and a longitudinal sectional view of another embodiment of this invention.

DETAILED DESCRIPTION OF THE INVENTION

Figure 3A:
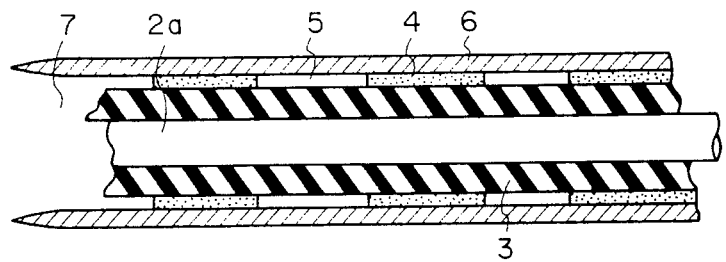
FIGS. 3A, 3B and 3C are longitudinal sectional views explanatory of the state of the optical fiber submarine cable of this invention in a case of the cable being broken.

With reference to FIGS. 1A and 1B, reference numeral 1 indicates an optical fiber; 2 and 2a designate nylon, polyethylene or like coating for mechanically reinforcing the optical fiber; and 3 identifies a coating deposited on an assembly of the optical fibers. The elements 1, 2, 2a and 3 constitute an optical fiber cord. Reference numberal 4 denotes a high viscosity material of good wettability, such as polyisobutylene, oil or the like; 5 represents air gaps disposed alternately with the high viscosity material 4 at proper intervals in the axial direction of the cable; and 6 shows a pressure resisting structure. In FIG. 1A, assuming that a material of a compressibility K is filled uniformly in a small-diametered pipe having a Young's modulus E, a Poisson's ratio $\nu$, an inner diameter $2a$ and an outer diameter $2b$, the internal pressure Q which is produced in the small-diametered pipe by the application thereto of a seawater pressure $-P$ is given by the following expression (1). In this case, however, the pipe is sufficiently long so that a plane strain can be supposed.

$$Q = \frac{-4(1 - \nu^2)b^2 p}{KE(b^2 - a^2) + 2(1 + \nu)(a^2 + b^2 - 2a^2)} \quad (1)$$

For example, in a case where an oil ($K = 50 \times 10^{-4}$ mm$^2$/kg) is filled in a copper pipe having a Young's modulus $E = 1.19 \times 10^4$ kg/mm$^2$, a Poisson's ratio $\nu = 0.33$, an inner diameter $2a = 1.5$ mm and an outer diameter $2b = 2.0$ mm, it follows from the expression (1) that $Q = -0.12$ P, which is a little larger than 10% of the seawater pressure. In a case of $P = 8$ kg/mm$^2$, which corresponds to the hydraulic pressure at a depth of 8,000 m, $Q = -0.98$ kg/mm$^2$; in a case of a multi-mode fiber, a transmission loss of about 1 dB/km is yielded (refer to Institute of Electronics and Communication Engineers of Japan, National Convention, 1978, Records of the Department of Light & Electromagnetic Waves, No. 348).

In view of the above, according to the present invention, in order to prevent application of a pressure to the optical fiber, the material of the compressibility factor K is not filled in the entire space of a pipe or like pressure resisting structure but is filled in the pipe at suitable intervals in its axial direction to provide therein air gaps at regular intervals; alternatively, a high viscosity material of good wettability which contains bubbles of air or gas in quantities to have increased compressibility factor equivalently is filled in the entire space of such a pressure resisting structure as a pipe. With such a construction, the air gaps whose volumes are larger than the pipe's deformation volume which is contracted by seawater pressure are provided in the axial direction of the pipe adjacent the high viscosity material of good wettability filled in the pipe, so that even if the pressure resisting structure is contracted by seawater pressure, the high viscosity material is not compressed but moves to the air gaps, producing substantially no internal pressure. Therefore, the influence of seawater pressure on the optical fiber is substantially negligible.

Further, even by mixing air or gas in the form of bubbles 5a in the high viscosity material so as to increase its compressibility factor and filling it in the entire space between the pipe and the optical fiber, as shown in FIG. 2, it is possible to ultimately obtain the same results as those obtainable by filling the viscosity material in the pipe at intervals with air gaps defined therebetween as described above.

Figure 3B:
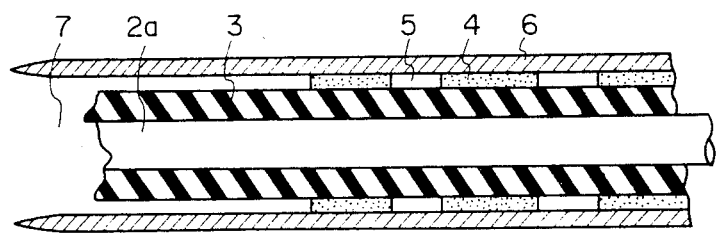
Figure 3C:
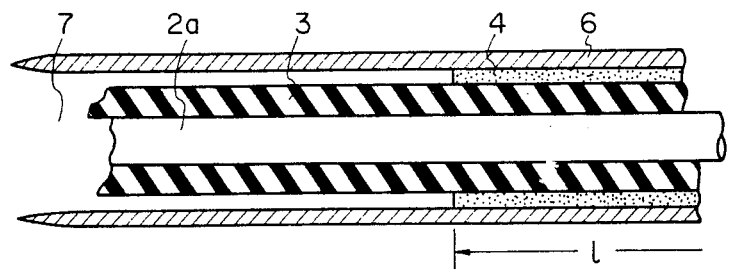

Moreover, in a case where the optical fiber submarine cable of the above construction is injured by fishing implements, an anchor or the like, the high viscosity material of good wettability present in the pressure resisting structure restricts entering thereinto of seawater to the injured part, preventing seawater from entering into the pressure resisting structure over the entire repeater section. That is, assuming that the cable is injured at a position indicated by 7 in FIG. 3A, seawater enters into the cable from the injured part, and the high viscosity material of good wettability filled in the abovesaid space moves little by little with the lapse of time, as shown in FIGS. 3B and 3C; namely, the length of the high viscosity material in the axial direction of the cable gradually increases, as indicated by l in FIG. 3C. Meanwhile, since pressure loss by pipe friction is proportional to l, entering of seawater at the injured part gradually decreases. Accordingly, the length of the injured cable to be replaced with a new one may be short, so that the cable structure of the present invention is economical.

In the example of FIG. 1, the high viscosity material 4 can easily be filled in the space between the coating 3 and the pressure resisting material layer by intermittently immersing into a high viscosity material bath an optical fiber cord having the coating 3. In the example of FIG. 2, the high viscosity material can be filled in the pressure resisting structure by flowing the gas 5a into the high viscosity material and continuously immersing the optical fiber cord in a bath of the high viscosity material containing the gas.

In the above description of the invention, the pressure resisting structure is described to be a pipe for the sake of easiness in calculation, but may also be some other member.

As has been described in the foregoing, according to the present invention, it is possible to obtain an optical fiber submarine cable which is simple in construction but which is capable of alleviating an increase in the internal pressure in the pressure resisting structure and which, even if broken, is capable of preventing or retarding entering of seawater into the pressure resisting structure to prevent degradation of cable characteristics and facilitating repair of the injured portion of the cable.

What we claim is:

1. In an optical fiber submarine cable, the improvement comprising a high viscosity material of good wettability containing air gaps and filled in a space between an optical fiber cord having housed therein at least one coated optical fiber and a pressure resisting material layer having housed therein the optical fiber cord for protecting it from seawater pressure.

2. An optical fiber submarine cable according to claim 1, wherein the air gaps and the high viscosity material are arranged alternately with each other in the space at suitable intervals in the lengthwise direction of the cable.

3. An optical fiber submarine cable according to claim 1, wherein the air gaps are contained in the form of bubbles in the high viscosity material.

4. An optical fiber submarine cable, comprising: a coated optical fiber core; a pressure resistant layer surrounding said optical fiber core and extending along the length of said optical fiber core; and a highly wettable high viscosity material disposed between said optical fiber core and said pressure resistant layer and having air containing voids interspersed in the region between said optical fiber core and said pressure resistant layer.

5. An optical fiber submarine cable according to claim 4, wherein said air containing voids are disposed spaced along the length of the cable with alternate regions of said highly wettable high viscosity material generally free of air containing voids.

6. An optical fiber submarine cable according to claim 4, wherein said air containing voids are disposed along the length of the cable with said air containing voids interspersed generally uniformly throughout said highly wettable high viscosity material.

7. An optical fiber submarine cable according to claim 5 or 6 wherein said coated optical fiber core is a coated optical multi-fiber cord.

* * * * *